United States Patent
Niedermeyer

(10) Patent No.: US 9,919,363 B2
(45) Date of Patent: *Mar. 20, 2018

(54) SYSTEM AND METHOD FOR MAKING NON-SPHERICAL NANOPARTICLES AND NANOPARTICLE COMPOSITIONS MADE THEREBY

(71) Applicant: ATTOSTAT, INC., Salt Lake City, UT (US)

(72) Inventor: William Harold Niedermeyer, West Jordan, UT (US)

(73) Assignee: ATTOSTAT, INC., Salt Lake City, UT (US)

( * ) Notice: Subject to any disclaimer, the term of this patent is extended or adjusted under 35 U.S.C. 154(b) by 219 days.

This patent is subject to a terminal disclaimer.

(21) Appl. No.: 14/861,500

(22) Filed: Sep. 22, 2015

(65) Prior Publication Data

US 2016/0082514 A1    Mar. 24, 2016

Related U.S. Application Data

(60) Provisional application No. 62/054,126, filed on Sep. 23, 2014.

(51) Int. Cl.
*B22F 9/04* (2006.01)
*B23K 26/02* (2014.01)
(Continued)

(52) U.S. Cl.
CPC .............. *B22F 9/04* (2013.01); *B22F 1/0044* (2013.01); *B23K 26/032* (2013.01); *B23K 26/06* (2013.01);
(Continued)

(58) Field of Classification Search
None
See application file for complete search history.

(56) References Cited

U.S. PATENT DOCUMENTS

| 4,515,740 A | 5/1985 | Schuttenberg et al. |
| 5,227,608 A | 7/1993 | Yoshida |

(Continued)

FOREIGN PATENT DOCUMENTS

| CN | 102120619 | 7/2011 |
| CN | 103891558 | 7/2014 |

(Continued)

OTHER PUBLICATIONS

NOAA Ocean Service Education, "Corals", downloaded from https://oceanservice.noaa.gov/education/kits/corals/coral03_growth.html on Sep. 5, 2017.*

(Continued)

*Primary Examiner* — George Wyszomierski
(74) *Attorney, Agent, or Firm* — Workman Nydegger

(57) ABSTRACT

Systems and methods for selectively making non-spherical metal nanoparticles from a metal material. The metal target surface is ablated to create an ejecta event or plume containing nanoparticles moving away from the surface. Ablation may be caused by laser or electrostatic discharge. At least one electromagnetic field is placed in front of the solid target surface being ablated. The electromagnetic field manipulates at least a portion of the nanoparticles as they move away from the target surface through the electromagnetic field to create coral-shaped metal nanoparticles. The distance between the electromagnetic field and metal surface can be adjusted to yield metal nanoparticles of a desired size and/or shape.

13 Claims, 11 Drawing Sheets

(51) Int. Cl.

| | | |
|---|---|---|
| *B22F 1/00* | (2006.01) | |
| *B23K 26/362* | (2014.01) | |
| *B23K 26/16* | (2006.01) | |
| *B23K 26/06* | (2014.01) | |
| *B23K 26/08* | (2014.01) | |
| *B23K 26/03* | (2006.01) | |
| *B23K 26/12* | (2014.01) | |
| *B23K 26/40* | (2014.01) | |
| *B23K 26/082* | (2014.01) | |
| *B23K 26/0622* | (2014.01) | |
| *B23K 26/361* | (2014.01) | |
| *B82Y 40/00* | (2011.01) | |
| *B23K 103/08* | (2006.01) | |
| *B23K 103/14* | (2006.01) | |
| *B23K 103/18* | (2006.01) | |
| *B82Y 30/00* | (2011.01) | |
| *B23K 103/02* | (2006.01) | |
| *B23K 103/12* | (2006.01) | |

(52) U.S. Cl.
CPC ...... *B23K 26/0604* (2013.01); *B23K 26/0622* (2015.10); *B23K 26/08* (2013.01); *B23K 26/082* (2015.10); *B23K 26/123* (2013.01); *B23K 26/127* (2013.01); *B23K 26/1224* (2015.10); *B23K 26/16* (2013.01); *B23K 26/361* (2015.10); *B23K 26/362* (2013.01); *B23K 26/40* (2013.01); *B22F 2202/05* (2013.01); *B22F 2202/06* (2013.01); *B22F 2202/11* (2013.01); *B22F 2301/255* (2013.01); *B22F 2304/054* (2013.01); *B23K 2203/02* (2013.01); *B23K 2203/08* (2013.01); *B23K 2203/12* (2013.01); *B23K 2203/14* (2013.01); *B23K 2203/26* (2015.10); *B82Y 30/00* (2013.01); *B82Y 40/00* (2013.01)

(56) References Cited

U.S. PATENT DOCUMENTS

| | | | |
|---|---|---|---|
| 5,390,864 A | 2/1995 | Alexander | |
| 5,585,020 A | 12/1996 | Becker et al. | |
| 6,509,070 B1 | 1/2003 | Voevodin et al. | |
| 7,014,737 B2 | 3/2006 | Harutyunyan et al. | |
| 7,332,351 B2 | 2/2008 | Tan et al. | |
| 7,371,457 B2 | 5/2008 | Oldenburg et al. | |
| 7,374,730 B2 | 5/2008 | Simard et al. | |
| 7,384,560 B2 | 6/2008 | Martens et al. | |
| 7,509,993 B1 | 3/2009 | Turng et al. | |
| 7,553,801 B2 | 6/2009 | Alexander et al. | |
| 7,662,731 B2 | 2/2010 | Itoh et al. | |
| 7,682,970 B2 | 3/2010 | Grigoropoulos et al. | |
| 7,700,032 B1 | 4/2010 | Lu et al. | |
| 7,884,160 B2 | 2/2011 | Wang et al. | |
| 7,985,367 B2 | 7/2011 | Hiromatsu et al. | |
| 8,685,293 B1 | 4/2014 | Coppa et al. | |
| 9,434,006 B2* | 9/2016 | Niedermeyer | B22F 9/04 |
| 2001/0031564 A1 | 10/2001 | Suzuki et al. | |
| 2003/0086859 A1 | 5/2003 | Kawakami et al. | |
| 2003/0102099 A1 | 6/2003 | Yadav et al. | |
| 2004/0214001 A1 | 10/2004 | Oldenburg et al. | |
| 2005/0061785 A1* | 3/2005 | Schroder | B01J 19/088 219/121.56 |
| 2006/0049034 A1* | 3/2006 | Lee | B01J 19/088 204/192.12 |
| 2006/0142853 A1 | 6/2006 | Wang et al. | |
| 2007/0287202 A1 | 12/2007 | Maehashi et al. | |
| 2008/0035682 A1 | 2/2008 | Coffey et al. | |
| 2008/0161631 A1 | 7/2008 | Axtell et al. | |
| 2008/0263940 A1 | 10/2008 | Parish et al. | |
| 2008/0292673 A1 | 11/2008 | Crudden | |
| 2009/0000186 A1 | 1/2009 | Sanders et al. | |
| 2009/0246530 A1 | 10/2009 | Murakami et al. | |
| 2010/0040655 A1 | 2/2010 | Ren et al. | |
| 2010/0050872 A1 | 3/2010 | Lee | |
| 2010/0068299 A1 | 3/2010 | van der Krieken et al. | |
| 2010/0072645 A1 | 3/2010 | Hiromatsu et al. | |
| 2010/0180413 A1 | 7/2010 | Jeong | |
| 2010/0183739 A1 | 7/2010 | Newman | |
| 2010/0187091 A1 | 7/2010 | Pierce et al. | |
| 2010/0196192 A1 | 8/2010 | Liu et al. | |
| 2011/0039078 A1 | 2/2011 | Brennan Fournet et al. | |
| 2011/0052460 A1 | 3/2011 | Coffey et al. | |
| 2011/0193025 A1 | 8/2011 | Ichikawa et al. | |
| 2011/0228890 A1 | 9/2011 | Dean et al. | |
| 2011/0244056 A1 | 10/2011 | Santra | |
| 2012/0088066 A1 | 4/2012 | Aytug et al. | |
| 2012/0136164 A1 | 5/2012 | Ying et al. | |
| 2012/0138862 A1 | 6/2012 | Hogan | |
| 2012/0164073 A1 | 6/2012 | Xu et al. | |
| 2012/0174472 A1 | 7/2012 | Mills | |
| 2012/0301531 A1 | 11/2012 | Uhlmann et al. | |
| 2013/0001833 A1 | 1/2013 | Niedermeyer | |
| 2013/0334104 A1 | 12/2013 | Marsh | |
| 2014/0274830 A1 | 9/2014 | Pol et al. | |
| 2014/0288194 A1 | 9/2014 | Niedermeyer | |
| 2016/0372243 A1* | 12/2016 | Cassignol | H01F 1/061 |

FOREIGN PATENT DOCUMENTS

| | | |
|---|---|---|
| CN | 104014811 | 9/2014 |
| KR | 20060021749 | 8/2006 |
| WO | WO2013141879 | 9/2013 |

OTHER PUBLICATIONS

Leisure Pro, "Coral Identification: Types of Coral (Part 1—Hard Coral)", downloaded from http://www.leisurepro.com/blog/explore-the-blue/coral-identification-types-of-coral-part-1 on Sep. 5, 2017.*

International Coral Reef Initiative, "What are Corals", downloaded from http://www.iciforum.org/about-coral-reefs/what-are-corals on Sep. 5, 2017.*

Chien et al., "Synthesis of nanoparticles: sunlight formation of gold nanodecahedra for ultra-sensitive lead-ion detection", Green Chem., vol. 13, pp. 1162-1166, May 2011.

International Search Report for PCT App. No. PCT/US2015/051642 dated Dec. 14, 2015.

International Search Report for PCT App. No. PCT/US2015/051638 dated Dec. 17, 2015.

International Search Report for PCT App. No. PCT/US2015/051640 dated Dec. 17, 2015.

International Search Report for PCT App. No. PCT/US2015/051643 dated Dec. 17, 2015.

International Search Report for PCT App. No. PCT/US2015/051649 dated Dec. 17, 2015.

International Search Report for PCT App. No. PCT/US2015/051646 dated Dec. 18, 2015.

Liu et al., "A novel coral-like porous SnO2 hollow architecture: biomimetic swallowing growth mechanism and enhanced photovoltaic property for dye-sensitized solar cell application", Chem. Commun., vol. 46, pp. 472-474, 2010.

Office Action, filed Jul. 1, 2011, Office Action dated May 30, 2014.

Final Office Action, filed Jul. 1, 2011, Final Office Action dated Nov. 13, 2014.

Office Action, filed Jul. 1, 2011, Office Action dated Jul. 6, 2015.

U.S. Appl. No. 13/175,708, filed Jul. 1, 2011, Final Office Action dated Mar. 28, 2016.

U.S. Appl. No. 14/861,243, filed Sep. 22, 2015, Final Office Action dated Jul. 26, 2016.

Badawy et al., "Surface Charge-Dependent Toxicity of Silver Nanoparticles", Environ. Sci. Technol. 2011, 45, 283-287.

U.S. Appl. No. 14/861,243, filed Sep. 22, 2015, Office Action dated Mar. 9, 2016.

International Search Report for PCT App. No. PCT/US2012/044907 dated Jan. 31, 2013.

(56) References Cited

OTHER PUBLICATIONS

U.S. Appl. No. 14/861,318, filed Sep. 22, 2015, Office Action dated Apr. 25, 2016.
U.S. Appl. No. 14/861,318, filed Sep. 22, 2015, Notice of Allowance dated May 20, 2016.
U.S. Appl. No. 14/861,318, filed Sep. 22, 2015, Corrected Notice of Allowance dated Jun. 15, 2016.
Santos et al., "Enhancemetn of antibiotic effect via gold:silver-alloy nanoparticles", J. Nanopart Res (2012) 14:859, pp. 1-8.
U.S. Appl. No. 14/861,442, filed Sep. 22, 2015, Office Action dated Sep. 29, 2016.
U.S. Appl. No. 14/864,443, filed Sep. 22, 2015, Office Action dated Nov. 2, 2016.
Jacobson, "These six diseases should worry you more than Ebola", Inside Energy Oct. 2014; [online] retrieved on Jan. 29, 2017 from http://www.pbs.org/newshour/updates/six-diseases-actually-worry/; 10 pages.
Pal et al., "Does the Antibacterial Activity of Silver Nanoparticles Depend on the Shape of the Nanoparticle?", Applied and Environmental Microbiology, 2007; 73(6): 1712-1720.
Rawashdeh et al., "Antibacterial Mechanisms of Metallic Nanoparticles: A Review", Dynamic Biochemistry, Process Biotechnology and Molecular Biology 2009 pp. 12-20.
Sahu et al., "Flower Shaped Silver Nanostructures: An Efficient Bacteria Exterminator", A Search for Antibacterial Agents; Chapter 2; [online] retrieved from: http://www.intechopen.com/books/a-search-for-antibacterial-agents; 2007; 73(6): 1712-1720.
U.S. Appl. No. 15/088,863, filed Apr. 1, 2016, Office Action dated Feb. 3, 2017.
U.S. Appl. No. 13/175,708, filed Jul. 1, 2011, Office Action dated Feb. 10, 2017.
U.S. Appl. No. 14/861,442, filed Sep. 22, 2015, Final Office Action dated Feb. 22, 2017.
Prabhu et al., "Silver nanoparticles: mechanism of antimicrobial action, synthesis, medical applications, and toxicity effects", International Nano Letters, 2012, 2:32, pp. 1-10.
U.S. Appl. No. 14/861,562, filed Sep. 22, 2015, Office Action dated Dec. 7, 2016.
U.S. Appl. No. 14/861,243, filed Sep. 22, 2015, Final Office Action dated Jan. 27, 2017.
Barcikowski et al., "Generation of nanoparticle colloids by picosecond and femtosecond laser ablations in liquid flow", Appl. Phys. Lett. 91, 083113 (2007).
Jana et al., "Seeding Growth for Size Control of 5-40 nm Diameter Gold Nanoparticles", Langmuir 2001, 17, 6782-6786.
Mafuné et al., "Formation of Stable Platinum Nanoparticles by Laser Ablation in Water", J. Phys. Chem. B 2003, 107, 4218-4223.
Phuoc et al, "Synthesis of Ag-deoionized water nanofluids using multi-beam laser ablation in fluids", Optics and Lasers in Engineering 45 (2007) 1099-1106.
Riabinina et al., "Influence of pressure on the Pt nanoparticle growth modes during pulsed laser ablation", Journal of Applied Physics 108, 034322 (2010, published online Aug. 12, 2010).
Sylvestre et al., "Surface Chemistry of Gold Nanoparticles Produced by Laser Ablation in Aqueous Media", J Phys. Chem. B 2004, 108, 16864-16869.
Sweeney et al., "Rapid Purification and Size Separation of Gold Nanoparticles via Diafiltration", J. Am. Chem. Soc. 2006, 128, 3190-3197 (Published on web Feb. 18, 2006).
U.S. Appl. No. 14/298,594, filed Jun. 6, 2014, Office Action dated Mar. 21, 2017.

\* cited by examiner

SYSTEM AND METHOD FOR MAKING NON-SPHERICAL NANOPARTICLES AND NANOPARTICLE COMPOSITIONS MADE THEREBY

CROSS-REFERENCE TO RELATED APPLICATIONS

This application claims the benefit of U.S. Provisional Patent Application No. 62/054,126, filed Sep. 23, 2014, the disclosure of which is incorporated herein in its entirety.

BACKGROUND

1. Field of the Invention

Disclosed herein are systems and methods for making nanoparticles, more particularly non-spherical nanoparticles having globular, coral-like shapes.

2. Relevant Technology

Various processes used to produce nanoparticles are known in the art. The term "nanoparticle" often refers to particles of any shape having a largest dimension of less than 100 nm.

U.S. Pat. No. 5,585,020 discloses methods for making nanoparticles with an average diameter of 73 nm and a standard deviation of 23 nm). This method utilizes laser ablation of initial diameter target particles of less than 100 microns within an inert gas or vacuum system.

U.S. Pat. No. 7,374,730 discloses methods for making nanoparticles within an organic liquid medium and uses stabilizing agents, such as surfactants or coating agents or other hydrocarbon materials, to prevent coalescence or growth of nanoparticles.

U.S. Pat. No. 7,662,731 identifies a need to prevent oxidation during laser sputtering/ablation and carries out ablation in superfluid helium.

U.S. Pat. Pub. No. 2013/0001833 to William Niedermeyer teaches that spherical particles are highly desirable because of their uniform shape and repeatable characteristics and discloses an apparatus and process for creating spherical nanoparticles from a solid target using ablation and an electromagnetic field configured to produce spherical nanoparticles of controlled size and narrow particle size distribution.

Picosecond ablation is known and provides shorter pulses that reduce the time for ions to form and helps control size; however, the power output of picosecond ablation is relatively small, limiting the quantity of material produced with relatively small ablation material plumes.

Nanoparticles can be grown into spheres through chemical reduction methods (e.g., silica), while production of spherical nanoparticles from other starting materials has traditionally been through a two-step process. In a first step, growth of nanoparticles from non-silica starting materials by chemical reduction methods produces non-spherical shapes, such as hedrons, platelets, rods, and other non-spherical shapes. While these methods provide good control for size, the resulting non-spherical shapes require further processing before they can become spherical in shape. In a second step, laser ablation is used to aggressively mill the non-spherical particles into quasi-spherical and/or spherical shapes. This process often produces unwanted "scrap" pieces and metal ions as byproduct. The spherical particles are then filtered to remove the ions and unwanted scrap.

SUMMARY

Disclosed herein are methods and systems for making coral-shaped metal nanoparticles and also nanoparticle compositions containing coral-shaped metal nanoparticles.

According to some embodiments, coral-shaped metal nanoparticles can have a non-uniform cross section and a globular structure formed by multiple, non-linear strands joined together without right angles.

According to some embodiments, a method for making coral-shaped metal nanoparticles comprises: (1) ablating a metal surface to create an ejecta plume containing metal nanoparticles moving away from the surface of the solid target; (2) providing at least one electromagnetic field in front of the metal surface being ablated at a distance and an energy density so as to cause the ejecta plume to form coral-shaped metal nanoparticles; (3) manipulating, using the at least one electromagnetic field, the ejecta plume moving away from the solid target surface so as to form coral-shaped metal nanoparticles; and (4) collecting the coral-shaped metal nanoparticles.

According to some embodiments, a laser ablation system for making coral-shaped metal nanoparticles comprises: (A) a metal surface; (B) an ablation laser configured to laser ablate the metal surface to create an ejecta plume containing metal nanoparticles moving away from the surface of the solid target; (C) one or more additional lasers positioned so as to produce at least one electromagnetic field in front of the metal surface at a distance and an energy density so as to cause an ejecta plume containing metal nanoparticles moving away from the surface of the solid target to form coral-shaped metal nanoparticles; and (D) a fluid adjacent to the metal surface for carrying the ejecta plume and the coral-shaped metal nanoparticles and collecting the coral-shaped metal nanoparticles.

It was also discovered that the distance of the at least one electromagnet field in front the metal surface being ablated can be selected to produce nanoparticles having a desired shape and/or size. Therefore, according to some embodiments, a method for making metal nanoparticles of a desired size and/or shape comprises: (1) ablating a metal surface to create an ejecta plume containing metal nanoparticles moving away from the surface of the solid target; (2) providing at least one electromagnetic field having a selected energy density; (3) positioning the at least one electromagnetic field having the selected energy density at a distance in front of the metal surface being ablated so as to cause the ejecta plume to form metal nanoparticles of the desired size and/or shape; (4) manipulating, using the at least one electromagnetic field, the ejecta plume moving away from the solid target surface so as to form metal nanoparticles of the desired size and/or shape; and (5) collecting the metal nanoparticles of the desired size and/or shape. By increasing or decreasing the distance between the electromagnetic field and the front of the metal surface, it is possible, for example, to selectively produce coral-shaped or spherical-shaped nanoparticles.

According to some embodiments, a metal nanoparticle composition comprises a plurality of coral-shaped metal nanoparticles, each coral-shaped metal nanoparticle having a non-uniform cross section and a globular structure formed by multiple, non-linear strands joined together without right angles, the coral-shaped metal nanoparticles having lengths in a range of about 15 nm to about 100 nm, or about 25 nm to about 95 nm, or about 40 nm to about 90 nm, or about 60 nm to about 85 nm, or about 70 nm to about 80 nm. The coral-shaped metal nanoparticles can have a mean length and wherein at least 99% of the coral-shaped metal nanoparticles have a length within 30% of the mean length, or within 20% of the mean length, or within 10% of the mean length.

According to some embodiments, coral-shaped metal nanoparticles and/or nanoparticles having a desired size and/or shape may comprise at least one metal selected from the group consisting of gold, platinum, silver, palladium, rhodium, osmium, ruthenium, rhenium, molybdenum, copper, iron, nickel, tin, beryllium, cobalt, antimony, chromium, manganese, zirconium, zinc, tungsten, titanium, vanadium, lanthanum, cerium, heterogeneous mixtures thereof, and alloys thereof.

These and other advantages and novel features of the invention will be set forth in part in the description which follows, and in part will become apparent to those skilled in the art upon examination of the following or may be learned by practice of the invention.

DETAILED DESCRIPTION OF THE PREFERRED EMBODIMENTS

Disclosed herein are methods and systems for selectively making coral-shaped metal nanoparticles and also nanoparticle compositions comprising coral-shaped metal nanoparticles. Whereas U.S. Pat. Pub. No. 2013/0001833 to William Niedermeyer ("Niedermeyer Publication") discloses laser ablation methods and apparatus configured to produce generally spherical-shaped nanoparticles of a desired size and narrow particle size distribution, it has now been discovered that coral-shaped metal nanoparticles, rather than spherical nanoparticles, can be selectively manufactured by repositioning an electromagnetic field at a given energy density to a distance that is further away from the metal surface being ablated. It is postulated that moving an electromagnetic field at a given energy density further away from the metal surface being ablated provides a smaller effect on the nanoparticles in the ejecta plume so as to not force them into a spherical shape. For purposes of disclosing methods and apparatus configured to manufacture generally spherical-shaped nanoparticles, the Niedermeyer Publication is incorporated herein by reference.

Figure 1:
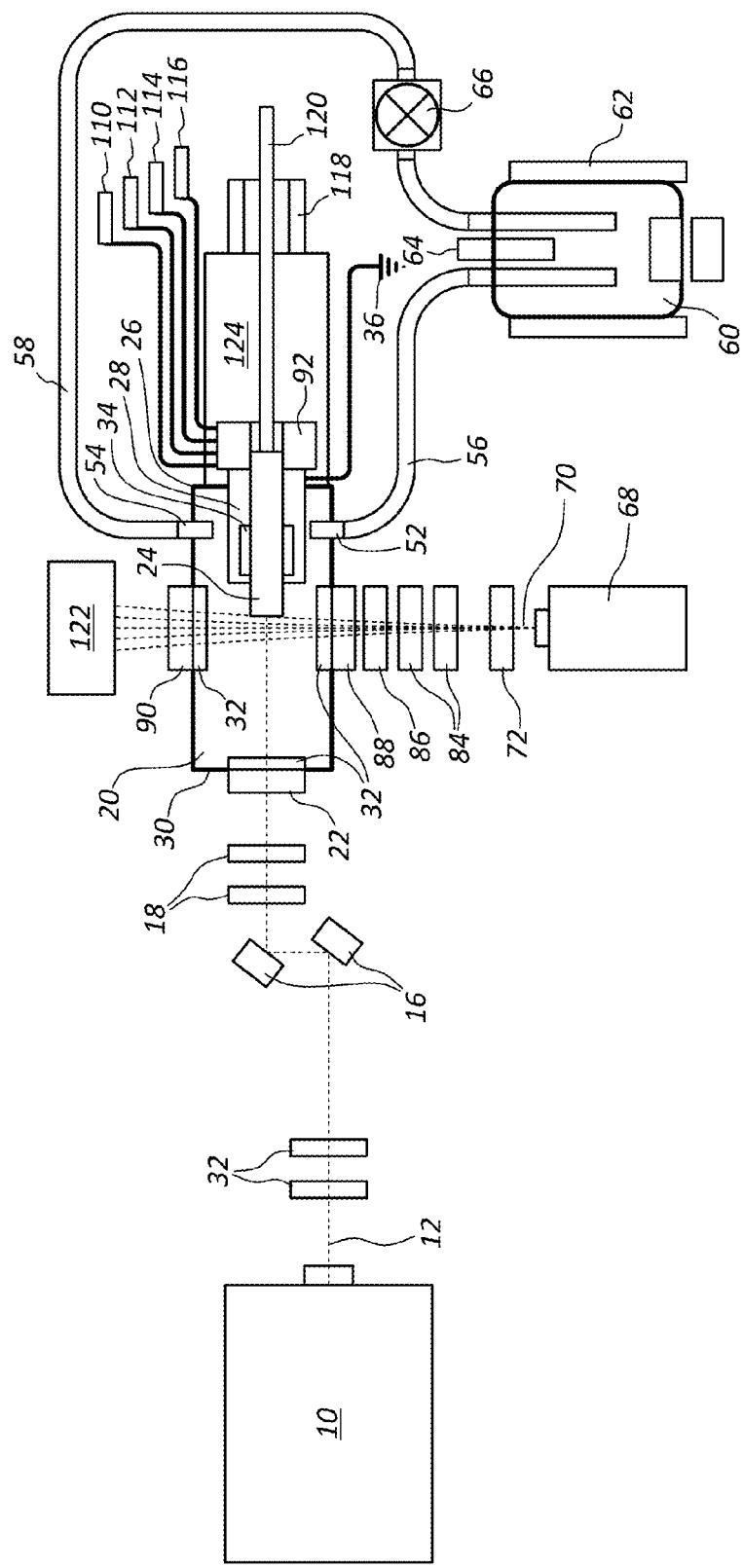
FIG. 1 schematically illustrates a system for making metal nanoparticles having a desired size and/or shape, including coral-shaped metal nanoparticles.

FIG. 1 schematically illustrates an embodiment of an apparatus for use in method or system for making metal nanoparticles and which can be configured and operated to selectively make coral-shaped metal nanoparticles. In addition, the apparatus of FIG. 1 can be reconfigured and operated, such as according to the Niedermeyer Publication, to selectively produce spherical-shaped metal nanoparticles (e.g., by moving an electromagnetic field closer to a metal surface being ablated).

FIG. 1 depicts a primary laser 10 configured to emit or deliver discrete energy packets of photon energy 12 in a pulsed manner. Typically, the diameter of pulsed emission 12 exiting primary laser 10 can be expanded through beam-expanding optics 14 to reduce its power density and allow pulsed emission 12 to move through scanning optics 16 without destroying optic coatings. After leaving scanning optics 16, pulsed emission 12 then typically passes through beam collimating optics 18 to create a desired spot size for pulsed emission 12 as it enters a chamber 20 through an optic window 22 and interacts with a target 24 (e.g., metal or metal alloy).

Scanning optics 16 can slightly adjust the direction of each pulse of emission 12 to move pulsed emission 12 around the surface of target 24 and are typically either polar or x-y scanners. This precludes pulsed emission 12 from repeatedly striking the exact same location on target 24, thereby allowing for optimal particle ablation during each pulse and efficiently utilizing target 24. Significantly, whether target 24 moves or pulsed emission 12 moves is less important than precluding repeated energy delivery to the same point on target 24. Further, one skilled in the art will recognize that the path of pulsed emission 12 preferably occurs within a hermetically sealed environment to preserve the integrity of laser beam profile (typically either a "top hat" or Gaussian profile).

The type and frequency of primary laser 10 is primarily a function of the target material to be ablated as well as considerations of commercial availability and cost of primary laser 10. Typically the target material of target 24 will have known wavelength absorption bands. Where no known wavelength absorption bands exist for a given target material, or where further optimization from reported values is desired, the frequency for primary laser 10 can be experimentally determined by finding a suitable and strong absorption band for the specific material to be ablated.

Further, the beam spot size and energy density will control the total energy delivered ($E_T$) in each energy packet or pulse for emission 12. This will be a function both of the target material's bonding energy ($E_B$) as well as the number of total atoms/molecules to be contained within the desired final coral-shaped nanoparticle. According to some embodiments, the total energy delivered ($E_T$) in each energy packet or pulse for emission 12 will typically be increased when making coral-shaped metal nanoparticles as compared to spherical-shaped metal nanoparticles because the coral-shaped particles themselves are typically larger than the spherical-shaped particles.

The duration for pulsed emission 12 is selected to preferably allow delivery of sufficient energy within each pulse or energy packet to ablate the target material of target 24, while still maintaining energy content of the pulse below the ionization energy of the target. This maximum pulse duration (PD) is particularly significant in the case of metallic targets and again can be determined experimentally or by dividing the target ionization energy ($E_I$—in joules) by the total energy delivered from emission 12 ($E_T$—in joules/sec) as shown by the following equation:

$PD = E_I/E_T$

By way of example, for preparation of spherical Ag nanoparticles with diameters less than 35 nm, for example, the pulse duration (PD) for creation of a suitable ejecta event has been found to be less than 10 nanoseconds. In order to create coral-shaped metal nanoparticles, such as gold coral-shaped nanoparticles, the pulse duration (PD) can be less than 1 microsecond and greater than 5 nanoseconds. In general, longer pulses yield larger particles, and shorter pulses yield smaller particles.

The profile of the laser beam can be selected to provide the most efficient transfer of photonic energy to phonon energy within the target, such as the well-known "top hat" or "Gaussian" profiles, and can be further tuned to deliver photonic energy packets of a specific time duration within an overall controlled area for an energy density that induces specific ejecta event shape, size, and density of ejecta material.

As further illustrated in FIG. 1, target 24 is preferably held within a back end 26 of hollow reactor chamber 20 by a target holder 28. A front end 30 of chamber 20 contains optic window 22, which permits passage of pulsed emission 12 therethrough on its way to target 24. Preferably, a small piezo-electrically controlled vibrator 32 can be mounted inside front end 30 of chamber 20 behind optic window 22 such that its regular vibration precludes buildup of nanoparticles on it, thereby protecting optic window 22. If nanoparticle buildup occurs on optic window 22, the propensity for damage by the incoming laser emission increases. The hollow interior of chamber 20 acts to contain the ejecta event (not shown) as the ejecta plume leaves the surface of target 24 after being impacted by each pulse of emission 12.

When a pulse from emission 12 interacts with the surface of target 24, the energy of the laser photons transfers into the lattice structure of the target, becoming phonon energy, which breaks the intranuclear bonds within the lattice structure and releases particles from the target surface. Because the bonding energies between the atoms within the lattice structure control the quantity of material that is ablated by a specific quantity of energy delivered to the target surface, lower bonding energies between atoms result in more rapid target material ablation. Accordingly, processes to "soften" a target, such as annealing, have been found to significantly increase the rate of a target's ablation. In some embodiments, target 24 can be heated by a target heater 34, which can increase the temperature of target 24 by approximately 10° C. above ambient conditions, for example, to further decrease the bonding energies within the target's lattice structure.

Despite attempts to control the energy delivered to the target surface to cause formation of specifically sized particles as discussed above, the particles of an ejecta event may contain a distribution of uncharged, nonionic particles ranging in size from small clusters of single digit atoms/molecules to particles of the generally desired size as well as many even larger particles. Further, in the case of metallic targets, even with laser energy delivered to the target being less than the target's ionization energy, the initial ejecta event will likely also contain some ionized, individual atoms. As such, metallic targets are preferably charged as an anode and grounded through an electrical outlet 36 so that ablated ionized atoms are electrostatically drawn back into target 24 and reabsorbed into the target material's crystalline structure, thereby eliminating or minimizing free ions in the ejecta event and subsequently produced nanoparticles.

In order to facilitate continuous production and removal of the ablated particles, chamber 20 typically contains a fluid input port 52 and a fluid output port 54, which are connected through input 56 and output 58 tubing or piping or other similar structures to a tank 60 or other similar holding vessel or chamber that contains the desired fluid, whether liquid or gas or other heavy atmosphere. The temperature of the fluid within tank 60 can be controlled through the use of a heating jacket 62 or other known mechanisms and preferably will contain a mechanism for mixing the fluid, whether by stirring or other mechanism. In systems utilizing liquids, the pressure within the chamber can be controlled by adjusting the height of the output port 54. The pressure in gas systems can be controlled by controlling the gas pressure. Similarly, in vacuum systems, the creation and maintenance of the vacuum within the system will operate with commonly understood components. Tank 60 can further include a sample port 64 which could also include sensors for temperature, pressure and/or fluid volume. Further, one skilled in the art will recognize and understand that all material surfaces within the chamber, input and output ports, tubing or piping and tanks are advantageously nonreactive, non-attractive and non-absorbent to or with the specific nanoparticles being created. For example, untreated glass and quartz can readily absorb many types of nanoparticles, particularly metallic particles, and can pose substantial problems for use as materials for the reaction chamber 20. Preferred materials therefore include relatively insert substances, such as teflon, PEEK, and PET. Further, where a pump 66 is needed for a liquid system, peristaltic pumps are preferred.

Fluid flow rate can be maintained at low linear velocities above target 24 to provide laminar flow through reaction chamber 20 so as to allow the particles within the ejecta event to interact with the gradient electromagnetic field(s) without interference from the fluid flow. Additionally, by minimizing the distance between target 24 and front 30 of reaction chamber 20, the volume of solution in front of target 24 through which emission 12 passes will be minimized. Over time, the quantity of uniformly sized nanoparticles that have passed through the gradient electromagnetic field(s) will increase within the fluid. Since emission 12 must pass through this fluid above target 24, emission 12 has the capacity to further split the particles contained within the fluid. By minimizing the volume above target 24, the quantity of particles that can potentially interact with emission 12 can be reduced and as such, continued destruction of the particles by the ongoing laser energy can be minimized.

The energy packets delivered to target 24 and the target material's bonding energies will be the primary control factors for the initial particle size distribution within the ejecta event, which initial particle size distribution can influence the size of particles ultimately produced. To produce larger coral-shaped nanoparticles instead of smaller spherical-shaped nanoparticles, the energy density of packets delivered to target 24 can be increased for a particular metal being ablated.

Figure 2:
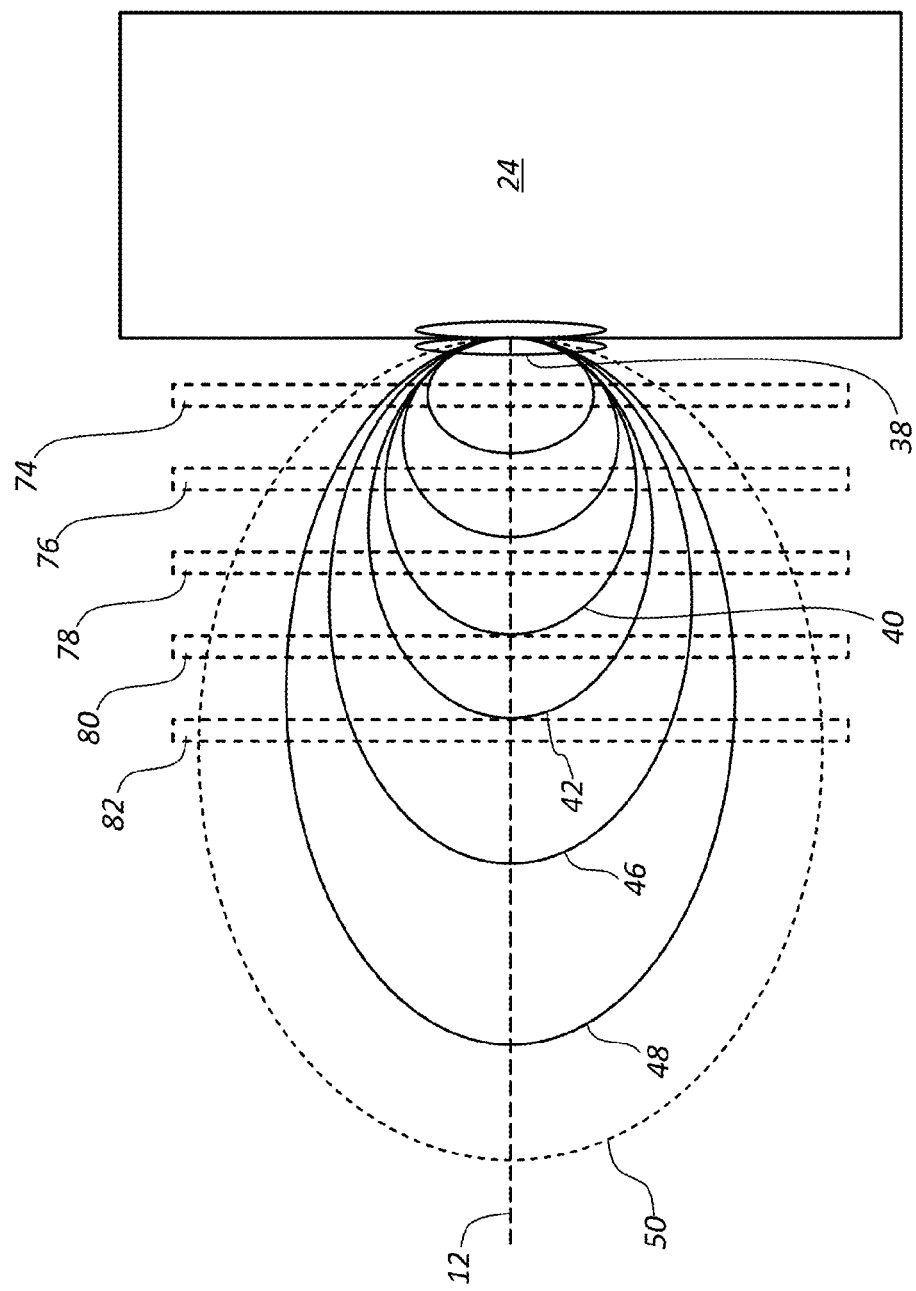
FIG. 2 schematically illustrates an ejecta plume within a heavy atmosphere or liquid moving away from a metal target surface and its interaction with multiple gradient electromagnetic fields.

FIG. 2 illustrates the behavior of ablated particles within an ejecta plume within a heavy atmosphere as they leave the surface of target 24 (i.e., not in a vacuum system, which would produce an ejecta spray rather than an ejecta plume). Because the embodiment of FIG. 1 presumes the utilization of a heavy atmosphere, as pulsed emission 12 interacts with target 24, the ablated particles form an initial ejecta plume containing discrete ejecta material within a Knudsen boundary layer 38 (which boundary layer would not exist in a vacuum system). This Knudsen boundary layer then proceeds to expand away from the surface of target 24 over time as shown by the boundary layers 40, 42, 44, 46, 48 until the ejecta plume loses all definition and the Knudsen boundary layer no longer exists at location 50.

To provide greater uniformity shape and stability of the nanoparticles and impart increased ξ-potential to the particles ablated from the surface of target 24, the system utilizes an electromagnetic field, such as multiple electromagnetic fields that are substantially parallel to the surface of target 24. In the embodiment shown in FIG. 1, a set of multiple electromagnetic fields are produced by a secondary laser 68 that emits a secondary laser beam 70. While the embodiment of FIG. 1 utilizes a laser to create the electromagnetic field(s), it is understood that multiple other sources of electromagnetic energy, such as sources of microwave energy, can be used.

Testing suggests that the use of the electromagnetic field(s) acts both to enhance overall particle size uniformity as well as increase particle stability as suggested by the Bond Order Length Strength (BOLS) model. Specifically, particles with enough phonon energy containing weak bonds appear to be broken during the laser ablation process, which would result in bond lengths in the ablated particles being longer at the particle's surface than at the particle's core. Utilization of the electromagnetic fields 74, 76, 78, 80 and 82 of FIG. 2 appears to shorten and strengthen these longer outer bonds, thereby strengthening and stabilizing that particle.

Figure 3:
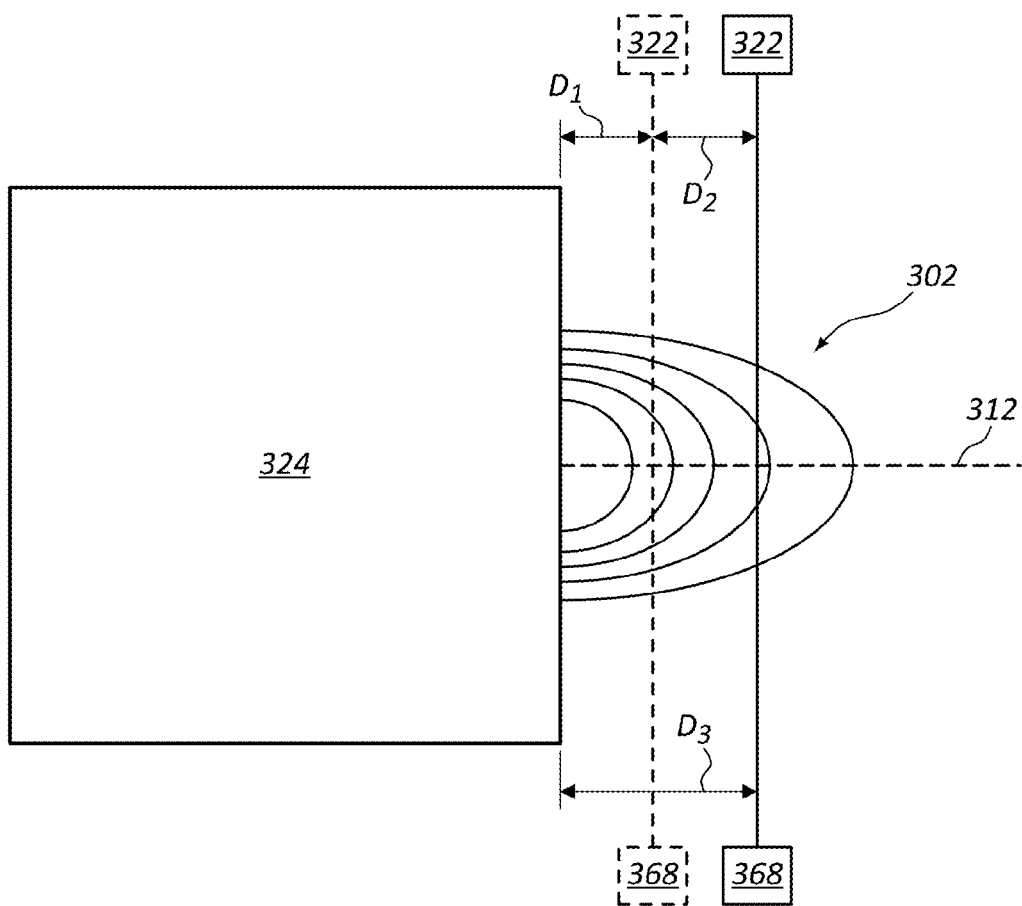
FIG. 3 schematically illustrates positioning one or more electromagnetic fields at a distance in from of the metal target surface in order to selectively produce nanoparticles of a desired size and/or shape, including selectively producing coral-shaped metal nanoparticles.
Figure 4A:
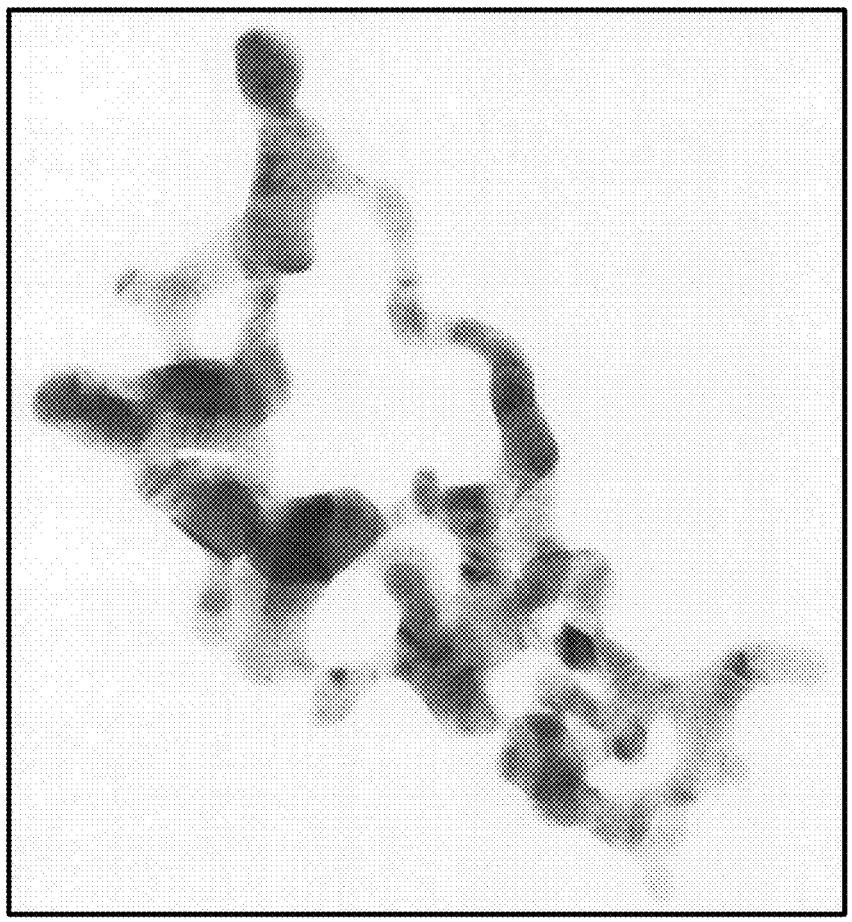
FIGS. 4A-4E are transmission electron microscope images (TEMs) of exemplary coral-shaped metal nanoparticles having a non-uniform cross sections and globular structures formed by multiple, non-linear strands joined together without right angles.
Figure 4B:
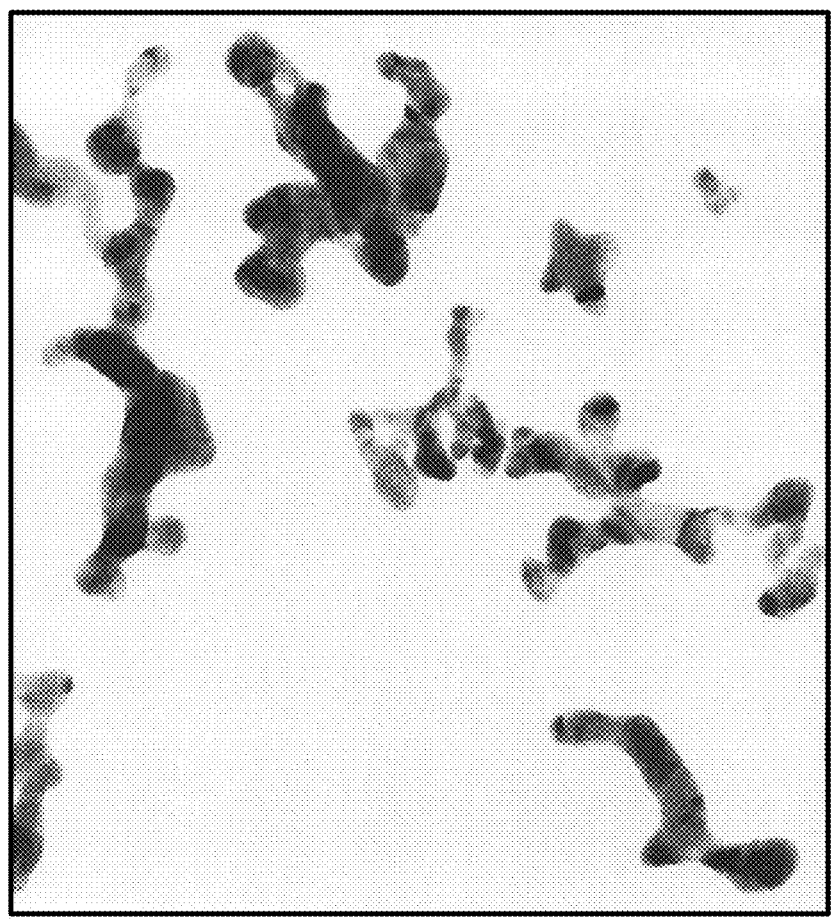
Figure 4C:
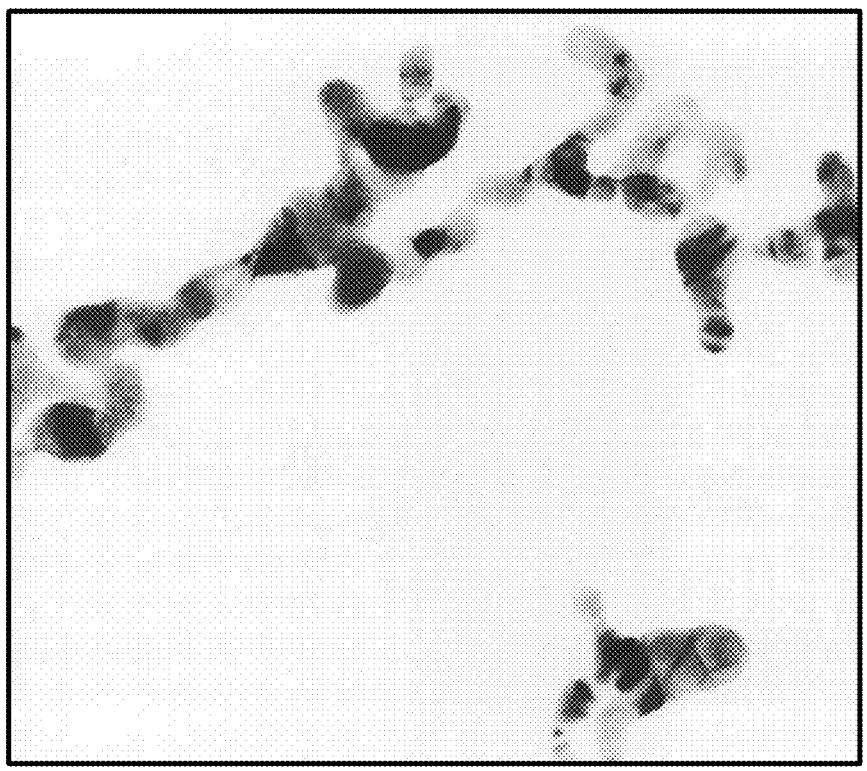
Figure 4D:
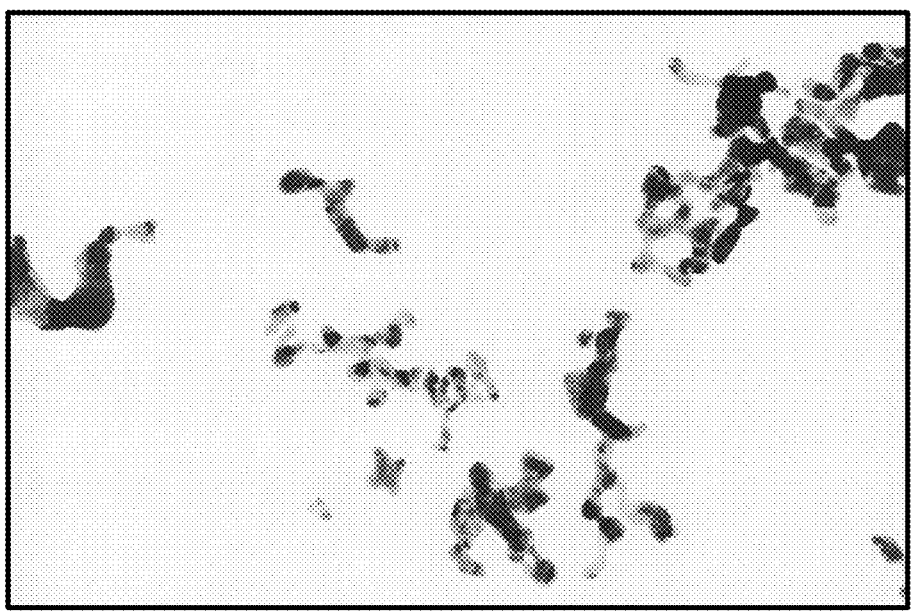
Figure 4E:
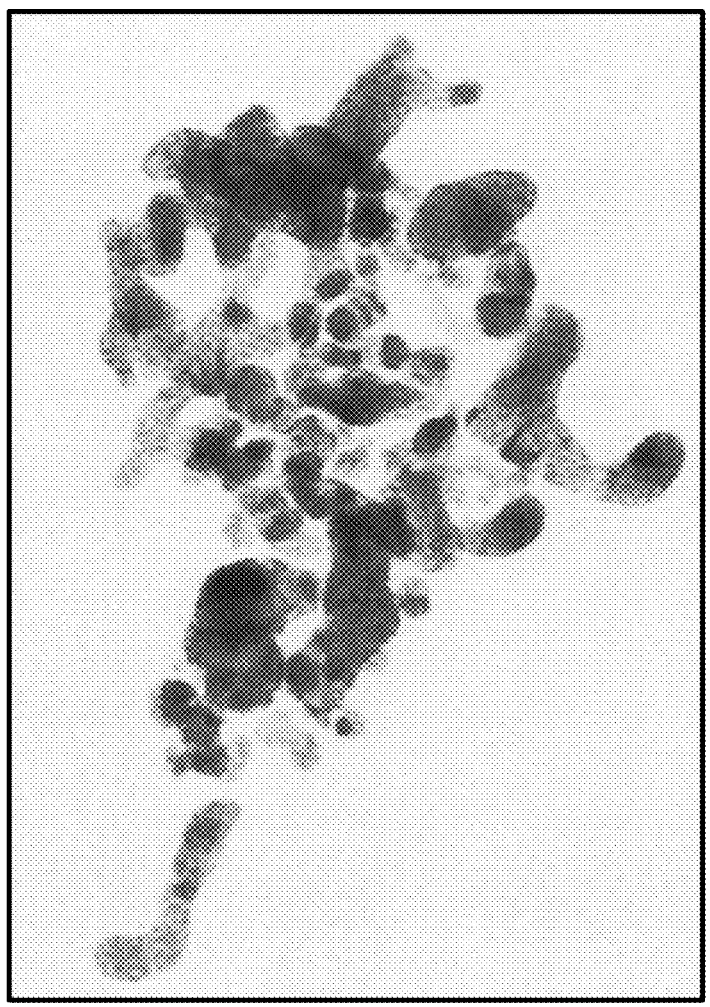

FIG. 3 schematically illustrates how an apparatus configured to produce spherical-shaped metal nanoparticles can be modified to produce coral-shaped metal nanoparticles.

In a first configuration for producing spherical-shaped metal nanoparticles using apparatus as disclosed herein, a secondary laser 368 and optional detector 322 is/are positioned at a first distance $D_1$ in front of the surface of a metal surface or target 324 being ablated by a pulsed emission 312 to form an ejecta plume 302. In order to selectively produce coral-shaped metal nanoparticles instead of spherical-shaped metal nanoparticles, secondary laser 368 can be positioned at or repositioned to a second distance $D_3$ in front of the surface of metal surface or target 324 being ablated by pulsed emission 312 (e.g., by moving or repositioning secondary laser 368 and optional detector 322 an additional distance $D_2$ beyond first distance $D_1$). Moving the secondary laser 368 (and optional detector 322) can be performed using any position adjustment means known in the art, including, but not limited to, one or more of electric motors, gears, pulleys, cables, rods, screws, set screws, knobs, rails, slots, magnets, and the like. A caliper, laser, or other distance measuring means can be used to determine and/or set an appropriate or desired distance of the secondary laser 368 in front of metal surface or target 324.

According to some embodiments, the energy density of one or more electromagnetic fields positioned in front of the surface of target 324 can remain the same in order to prevent ionization while maintaining desired nanoparticle manipulation forces. However, it has now been found when the one or more electromagnetic fields are positioned further away from the surface of target 324 (e.g., by second distance $D_3$), it/they can have a smaller effect on the nanoparticles in the ejecta plume so as to reduce or minimize the forces required to force or cause the nanoparticles to form spherical nanoparticles. Instead, coral-shaped metal nanoparticles can be formed by selecting an appropriate distance of electromagnetic fields in front of the metal target surface.

By way of example, when an apparatus as illustrated in FIG. 1 is configured to make spherical-shaped metal nanoparticles, such as according to methods disclosed in the Niedermeyer Publication, the at least one electromagnetic field can be positioned at a distance of about 0.5 mm to about 1.5 mm, or about 0.75 mm to about 1.25 nm, or about 0.95 mm to about 1.05 mm in front of the metal surface being ablated so as to manipulate the ejecta plume and form spherical-shaped metal nanoparticles having a particle size of 40 nm or less, 35 nm or less, 30 nm or less, 25 nm or less, 20 nm or less, 15 nm or less, 10 nm or less, 7.5 nm or less, or 5 nm or less.

By comparison, when an apparatus as illustrated in FIG. 1 is configured to make coral-shaped metal nanoparticles as disclosed herein, the at least one electromagnetic field can be positioned at a distance of about 0.5 mm to about 5 mm, or about 1 mm to about 3 mm, or about 1 mm to about 2.5 mm in front of the metal surface being ablated so as to manipulate the ejecta plume and form coral-shaped metal nanoparticles having a particle size of about 15 nm to about 100 nm, or about 25 nm to about 95 nm, or about 40 nm to about 90 nm, or about 60 nm to about 85 nm, or about 70 nm to about 80 nm. It has been observed that the quality of the optics creating the electromagnetic field from a laser will have a significant bearing on the optimal distance.

In some embodiment, at least 99% of the coral-shaped metal nanoparticles can have a length within 30% of the mean length, or within 20% of the mean length, or within 10% of the mean length. The ability to form coral-shaped metal nanoparticles having controlled sizes and/or a narrow particle size distribution is a surprising and unexpected result, particularly since the particles are not being forced into a uniform, spherical configuration.

In general, while the initial acceleration of nanoparticles leaving target 24 can typically reach velocities at or near sonic speed, the particle accelerations can be controlled though the use of pressure within the reaction chamber. This means that in a vacuum the near sonic speed will not be substantially diminished as the nanoparticles move toward and ultimately deposit onto the front end 30 of the chamber 20. However, where either gas or liquid media are used to manipulate nanoparticle flow, the pressure within reaction chamber 20 can be modified to have an effect on the rate of accelerations in the ejecta plume, thereby providing the particles with greater or lesser time to be affected by the electromagnetic field(s) created by secondary laser emission 70. Again, such variables can be modified to yield coral-shaped metal nanoparticles of desired size and/or shape.

According to some embodiments, the energy density of pulsed emission 312 can remain the same or, alternatively, it can be increased in order to increase the rate of ablation and/or to create larger metal nanoparticles within ejecta plume 302. This can yield coral-shaped nanoparticles of larger size compared to when using a pulsed emission 312 with lower energy density.

Returning to FIGS. 1 and 2, prior to secondary emission 70 passing into reactor chamber, this beam can pass through a holographic diffraction grating optic 72 that produces five identifiable and discrete beams of differing spatial orders and different energies 74, 76, 78, 80 and 82 that can act as discrete electromagnetic fields. While five discrete beams are shown in FIG. 2, the number of such beams may be greater than five or less than five (e.g., three). The holographic diffraction grating optic 72 will preferably allow at least 95% of the energy of secondary emission 70 to pass through. Of course, rather than utilize a diffraction grating optic to create multiple discrete laser emissions or fields from a single source laser emission, multiple individual lasers could be utilized to achieve the same effect. The frequency and intensity of these electromagnetic fields can be correlated between the absorption bands of the target material and the plasmon resonance of the ultimately desired sized coral-shaped nanoparticle. Typically the frequency of secondary laser emission 70 will be in the range of multiples of the frequency of the primary laser emission 12. The frequency is preferably a frequency that is absorbed by the target material, but is absorbed less by the material once it has been ablated and forms the desired particle size and shape, which should be a factor of the plasmon resonance of the ultimately desired sized nanoparticle.

Further, a minimum energy density of the discrete electromagnetic fields 74, 76, 78, 80 and 82 may be advantageous to cause manipulation of the nanoparticles caused by the ejecta event, as opposed for example to mere observation of the ejecta event. This manipulation has the effect of imparting sufficient energy to the nanoparticles that will cause mis-sized particles, i.e., particles that are either larger or smaller than desired, to either lose mass (in the case of nanoparticles that are too large) or gain mass (in the case of nanoparticles that are too small) as well as cause the nanoparticles to adopt a more uniform overall size. It is believed that this effect occurs because mis-sized particles will more readily absorb the energy of a discrete electromagnetic field of a specific frequency than the desired-sized particles. Because the desired-sized particles absorb little energy from the electromagnetic field, little impetus exists for these particles to change size or shape as they move through the electromagnetic field. Conversely, because mis-sized particles will absorb the energy from the electromagnetic field, the resulting vibrational and/or motion state of these particles creates an impetus for these mis-sized particles to gain or lose material so as to conform to a size and shape that is in harmony with the electromagnetic field.

This determination of the energy density of an electromagnetic field can begin by estimating the mass of all particles within the ejecta event (the mass of a single ejecta event can be determined by weighing the target before and after ablation and calculating the mass loss per ejecta event). Additionally, the mass of the size and shape of the ultimately desired nanoparticles is also known.

When utilizing a laser method to create the discrete electromagnetic fields, the energy of photons at the given frequency is known. Therefore, a minimum quantity of photons that are necessary to cause change in a single particle to a desired size and shape can be determined experimentally. The more mass within the ejecta event, the higher required energy density of any one of the discrete electromagnetic fields. Further, the maximum energy density of any one of the discrete electromagnetic fields will preferably be less than the ionization energy of the material (e.g., metal) of the desired sized nanoparticles. Once the energy densities of each of the electromagnetic fields is known, then the total energy density of secondary beam 70, which is used to create the multiple discrete electromagnetic fields, will likewise be known.

Again, as shown in FIG. 1, after passing through diffraction grating optic 72, the now five discrete laser emissions then preferably pass through intensifying optics 84, such as collimating lenses, which ensure that the maximum amount of energy is applied to the nanoparticles in the ejecta plume. The discrete laser emissions then pass through a cylindrical lens 86, which takes the discrete linear laser emissions and turns them into discrete planar laser emissions that then pass into chamber 20 through an input optic window 88 and then in front of target 24 and ultimately out the opposite side of chamber 20 through an output optic window 90. One of skill in the art will understand that the optics may include coatings and properties that reduce losses in a specific laser emission frequency and power for maximum efficiency and are advantageously able to withstand degradation of the optics by the power of the laser emission. Additionally, input and output optics 88 and 90 respectively may each advantageously have a piezo-electrically controlled vibrator 32 that can be mounted inside chamber 30 behind both optics such that regular vibration of the optics will preclude buildup of particles, thereby protecting both the optics from particle buildup and subsequent degradation by secondary laser emissions.

As can be seen in FIG. 2 the discrete fields can be generally parallel to target 24 and perpendicular to primary laser emission 12 such that if laser emission 12 is designated as an x-axis, each of the discrete fields from emission(s) 70 form a y-z plane in front of target 24. Depending on the exact specification of holographic diffraction grating optic 72, the spatial orders of the discrete laser emissions of the fields can be ordered. The laser emission fields closest and farthest from target 24, i.e., fields 74 and 82, respectively, can have identical energy densities, as can the fields adjacent to the center, i.e., fields 76 and 80. The center field, i.e., field 78, can be of a different energy density from the other two sets of fields. In one example, outer fields 74 and 82 can have the lowest density, fields 76 and 80 can have higher energy density, and center field 78 can have the highest energy density. In another example, outer fields 74 and 82 can have the highest density, fields 76 and 80 can have relatively lower energy density, and center field 78 can have the lowest energy density. Ideally, the closest electromagnetic field 74 is at or near the target surface 24 such that the effect of the field on the particles is nearly instantaneous. At a minimum, it is preferred that first electromagnetic field 74 act on the ejecta plume before the Knudsen boundary layer dissipates.

When configured to produce spherical-shaped nanoparticles, nanoparticles, as taught in the Niedermeyer Publication, within the ejecta plume that have passed through this series of electromagnetic fields are observed to possess relative uniformity of shape and size, with >99% of the spherical particles being within ±3 nm, ±2 nm, or ±1 nm having been observed. Furthermore, such a process can also impart a high ξ-potential to spherical nanoparticles, which greatly inhibits or prevents agglomeration and yields particles that can remain dispersed in a polar liquid without a surfactant. In some embodiments, the "spherical-shaped metal nanoparticles" can have a ξ-potential greater than 10 mV, preferably greater than about 15 mV, more preferably greater than about 20 mV, even more preferably greater than about 25 mV, and most preferably greater than about 30 mV.

Alternatively, when reconfigured to produce coral-shaped nanoparticles, nanoparticles within the ejecta plume that have passed through this series of electromagnetic fields are observed to possess relative uniformity of size, but not necessarily shape, as illustrated in FIGS. 4A-4E. Nevertheless, such a process can yield coral nanoparticles with no right angles and therefore no external edge or external bond angles. Similar to spherical-shaped particles, coral-shaped nanoparticles can have only interior bond angles, which greatly inhibits or prevents ionization. In some embodiments, the "coral-shaped metal nanoparticles" can have a ξ-potential greater than 10 mV, preferably greater than about 15 mV, more preferably greater than about 20 mV, even more preferably greater than about 25 mV, and most preferably greater than about 30 mV.

The disclosed apparatus is not limited to the use of five electromagnetic fields created from a holographic diffraction grating optic. For example, where only three electromagnetic fields are utilized in place of the five fields of the above embodiment, one might expect less size uniformity as well as lower ξ-potential. Where a single electromagnetic field is used in place of the five fields of the above embodiment, one would expect size uniformity and/or shape to increase compared to a system without any electromagnetic field, but less than multiple electromagnetic fields.

FIGS. 4A-4E are transmission electron microscope images (TEMs) of exemplary coral-shaped metal nanoparticles having non-uniform, asymmetrical cross sections and globular structures formed by multiple, non-linear strands joined together without right angles. In many cases, the coral-shaped nanoparticles include non-uniformly and asymmetrically shaped strands, some of which form closed loop structures with no free ends and some of which form strands or branches. In most cases, it appears the non-uniformly shaped strands have an essentially non-linear configuration with no right angles. The diameters of the non-uniformly and asymmetrically shaped strands can also vary along their length. Multiple closed loop structures and/or strands can be joined together, typically in a non-uniform, asymmetrical fashion.

Figure 5:
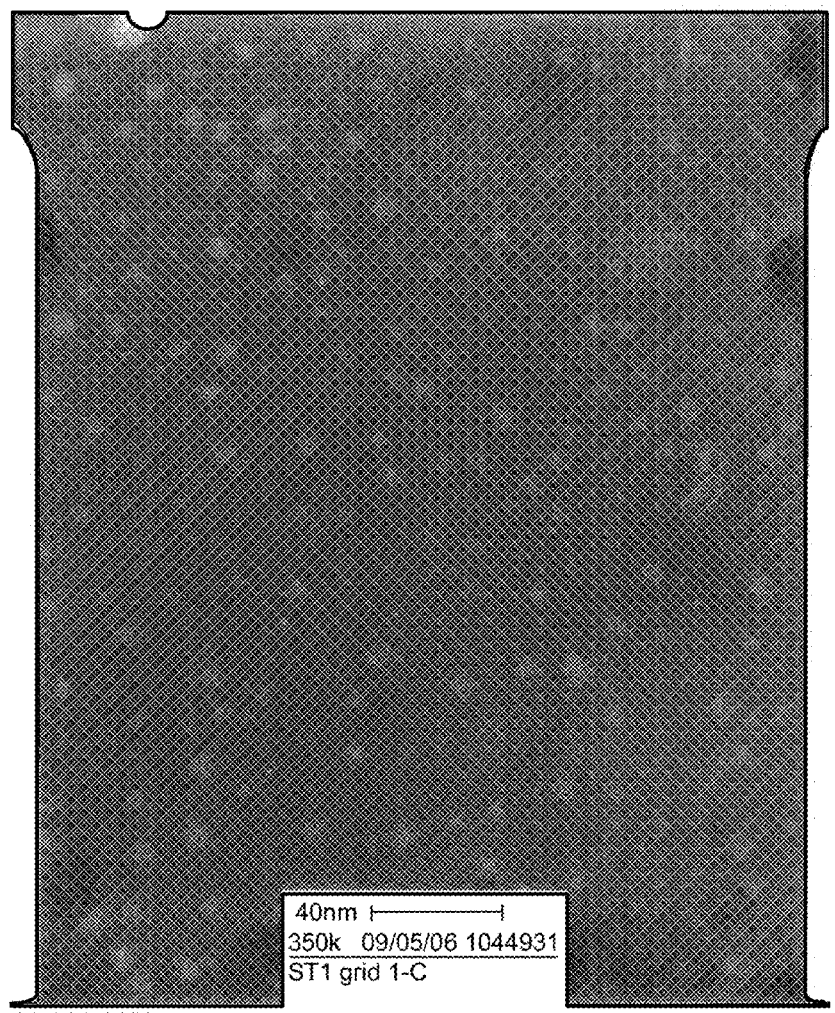
FIG. 5 is a transmission electron microscope image (TEM) of exemplary spherical-shaped metal nanoparticles having substantially uniform size and narrow particle size distribution for use in treating fibrous articles.

In contrast to coral-shaped nanoparticles, FIG. 5 is a transmission electron microscope image (TEM) of exemplary spherical-shaped metal nanoparticles made using the apparatus when configured as in the Niedermeyer Publication. The spherical-shaped nanoparticles have substantially uniform size and narrow particle size distribution.

Figure 6:
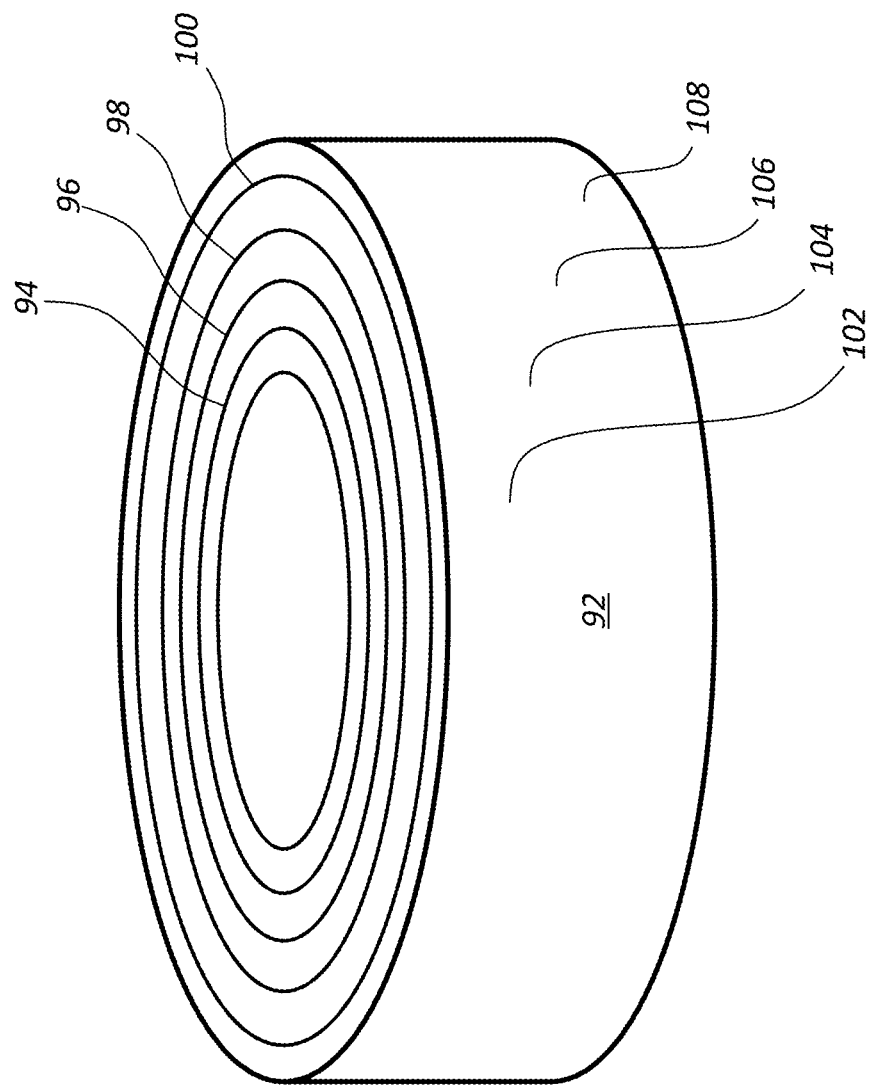
FIG. 6 schematically illustrates a toroid containing multiple concentric bands on its surface.

In a further refinement, a ceramic (or other nonmetallic) toroid 92 can be mounted around target 24. As shown in FIG. 6, a top side of toroid 92 can have multiple metallic concentric bands 94, 96, 98 and 100 disposed on the surface of toroid 92. Concentric metallic bands 94, 96, 98 and 100 can be connected to electric leads 102, 104, 106, and 108, respectively. Electric leads 102, 104, 106 and 108 can each be connected to individual high voltage power suppliers 110, 112, 114 and 116 (shown in FIG. 1), which can produce a gradient electric field around and in front of target 24. This gradient electric field is used in addition to, and not in replacement of, the electromagnetic field(s) discussed above. The gradient electric field can be used to manipulate accelerations and movement of nanoparticles within chamber 20. The gradient field can be controllable by changing voltages on metallic concentric bands 94, 96, 98 and 100. For example, in a vacuum process, nanoparticle movement can be controlled by the gradient electric field.

Because target 24 is depicted in FIG. 1 as having a significant length for this specific embodiment some, additional components may be included to maintain the target surface at a desired distance from primary laser 10 so as both to maintain the focal point for primary laser emission 12 as well as the spatial relationship of electromagnetic fields 74, 76, 78, 80 and 82 with the target surface so as to retain consistent effects of these fields on the particles within the ejecta plume. In the embodiment shown in FIG. 1, this can be accomplished through a screw mechanism 118, which moves a pinion bar or rod 120, which can move target 24 forward as the target surface is ablated by laser 12, although one of skill in the art will recognize that other mechanisms can be used as well. This same mechanism can be used to selectively increase or decrease the distance between the one or more electromagnetic fields and the target surface (e.g., between distances $D_1$ and $D_3$ as illustrated in FIG. 3) in order to selective produce metal nanoparticles that are either coral-shaped or spherical-shaped, as described herein.

A detector 122 can be used to monitor the position of the face or surface of target 24 by multiple known methods, including by monitoring the first electromagnetic field 74 for a slight interruption by the target face. Conversely, rather than moving target 24 the focal point for laser 12 and the position of electromagnetic fields 74, 76, 78, 80 and 82 can be changed as the target face moves due to the loss of material from repeated ablations. Similarly, rather than using large targets, small and thin targets can be utilized, or the same effect can be achieved if the targets are routinely changed. In yet a further embodiment, multiple targets can be loaded into a target containment vessel 124, which can act in conjunction with screw mechanism 118 and pinion bar 120 to allow for multiple targets to be ablated without the need to manually insert a new target 24 into chamber 20.

As nanoparticles exit the gradient electromagnetic field(s), the process can produce nanoparticles with high ξ-potential (preferably at least 30 mV for spherical particles). This means that these nanoparticles, when suspended within any liquid, including any polar liquid such as water, exert uniform forces on each other and thereby remain suspended in solution without the need for any added surfactants. The lack of surfactants now allows introduction of these nanoparticles into applications where the presence of the surfactants would otherwise prove problematic, such as biological systems.

When utilizing a liquid as the carrier for the nanoparticles, any organic, non-polar compound can be used, as well as polar solutions including alcohols and water. The selected liquid can be free from ions and particulate matter to prevent unwanted agglomeration of nanoparticles to impurities within the liquid. When using water, multiple methods exist to remove ionic and particulate matter, including distillation and even multiple distillations, reverse osmosis, deionization techniques and ultrafiltration.

Figure 7:
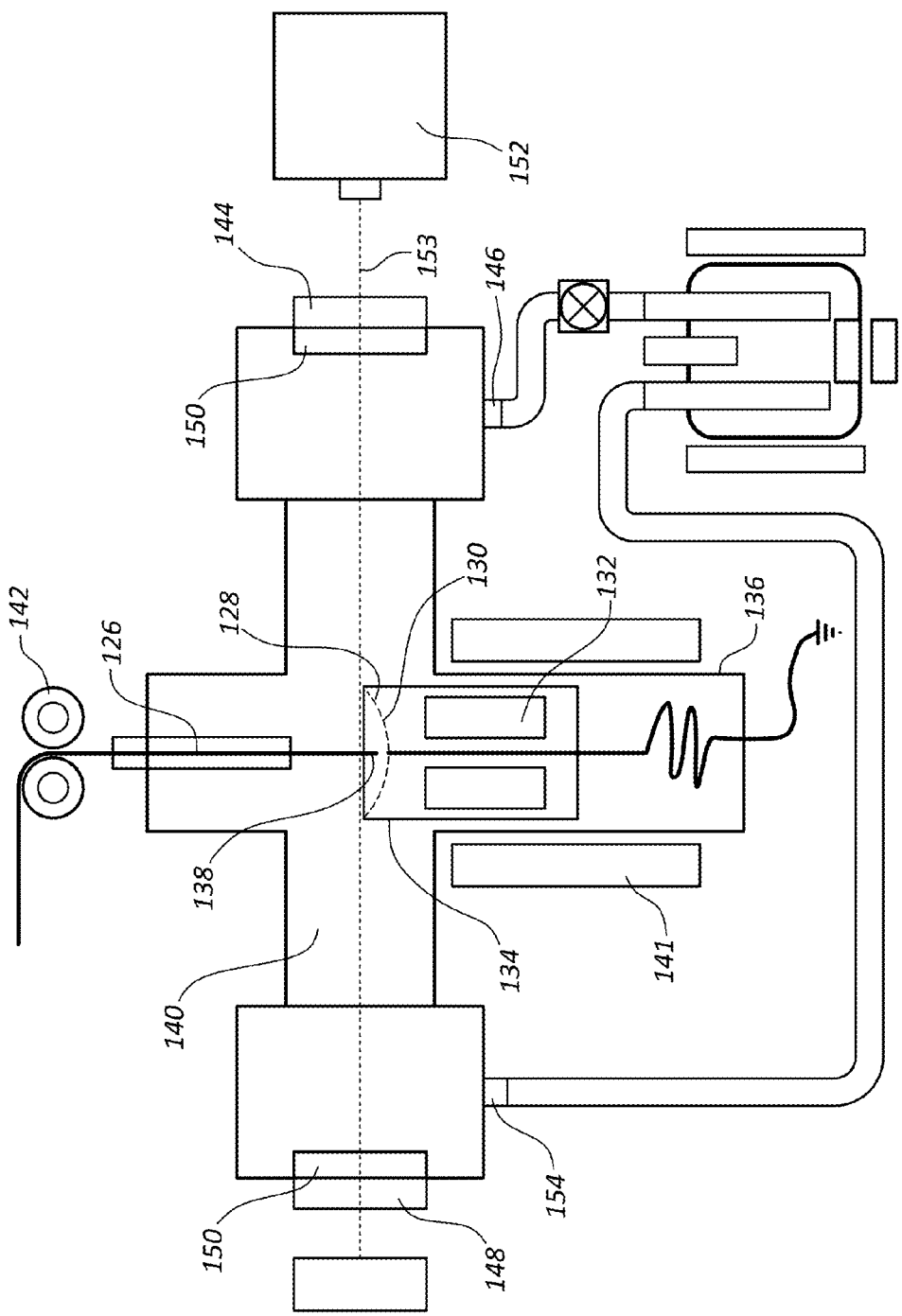
FIG. 7 schematically illustrates an apparatus for performing ablation using electrical discharge.

FIG. 7 schematically illustrates another embodiment of an apparatus for use in making nanoparticles, wherein the ejecta plume is created by an electric discharge process instead of laser ablation. Since electric discharge can produce ablation in a vacuum system, only an ejecta plume is created in such a system. As will be readily understood by one skilled in the art, many of the same principles that apply to the laser ablation process can apply to a process to ablate material using electric discharge. For example, rather than a primary laser beam impacting a target, the electric discharge process utilizes a target anode 126 (e.g., wire) to create an ejecta plume near a surface 128 of a cathode material 130. In the embodiment illustrated in FIG. 7, this may be accomplished by placing cathode material 130 inside a holder 134 that contains a permanent magnet 132. Holder 134 can be held within a tube 136 that is part of a chamber 140. An electromagnet 141 extends around tube 136 and, when energized, creates a magnetic field that drives holder 134 upwards toward a tip 138 of target anode wire 126. The electric potential difference between anode wire 126 and cathode material 130 is sufficient to break down the resistance of the heavy atmosphere between surface 128 of cathode material 130 and tip 138 of anode wire 126, which discharge creates an ejecta plume of material from anode 126 that moves toward surface 128 of cathode material 130 and which then effectively bounces off of a curved cathode surface 128 and then moves through electromagnetic field(s) 153. The upward movement of holder 134 can be limited either by a piston-type control from the bottom of the holder or by physical interaction of cathode surface 128 with tip 138 of anode wire 126. As anode wire 126 loses mass through the ablation of tip 138, its length can be maintained by a wire feeding mechanism 142.

With the ejecta plume formed in the same location on each upward pulse of cathode material 130 and moving within the main cavity of chamber 140, an electromagnetic field 153, or preferably gradient electromagnetic fields 153, can then be introduced into the main cavity of chamber 140 through an optic window 144 at one end of chamber 140 while exiting through a second optic window 148 at the other end of chamber 140. As with the optics shown in FIG. 1, the input and output optics 144 and 148 can also include piezo-electrically controlled vibrators 150 to help prevent particle buildup on optics 144, 148. The frequency and strength of electromagnetic field or fields 153, whether created from a secondary laser 152 (or set of lasers) or other sources will be determined by the same parameters as those described above for the gradient electromagnetic fields in FIGS. 1 and 2.

Fluid flow can be introduced into chamber 140 through an input port 146 and exit through an output port 154, which fluid can be used to collect the nanoparticles after they have passed through the electromagnetic field(s) 153. Additionally, one of skill in the art can readily understand how this single arrangement of an anode wire and cathode material can be replicated, preferably in a linear manner, to utilize the same electromagnetic field or multiple gradient electromagnetic fields for multiple anode-cathode units in order to increase production of nanoparticles.

Consistent with the creation of an ejecta plume using laser ablation, the strength and duration of the electrical pulse from tip 138 of anode wire 126 will determine the total energy delivered (ET) per pulse and will be a function both of the target material's bonding energy (EB), the ionization energy (EI) as well as the number of total atoms/molecules to be contained within the desired shape of the final nanoparticle, which spherical- or coral-shaped. As with the apparatus shown in FIG. 1, coral-shaped metal nanoparticles can be formed instead of spherical-shaped metal nanoparticles by increasing the distance between electromagnetic field(s) 153 and tip 138 of anode material 126.

Even with the attempt to control particle size through precise energy delivery to the target surface, as with the ejecta plume created by laser ablation, the plume may contain a distribution of uncharged, nonionic particles ranging in size from small clusters of single digit atoms/molecules to nanoparticles of generally desired size as well as many larger particles. Further, because the electrical discharge method will almost always utilize metallic targets (because they act as the anode of the electric circuit), even though the energy delivered to the target will be less than the target's ionization energy, the initial ejecta plume may likely also contain some ionized, individual atoms. However, because anode target wire 126 is an anode, the ionized atoms will readily be pulled back to anode target 126 and reabsorbed into the crystalline matrix of the material.

Similarly, control of the velocity of the ejecta plume can also be accomplished through use of the fluid pressure within the reaction chamber in the same manner as discussed above with the laser ablation method.

EXAMPLES

The following examples and comparative are given to illustrate various embodiments within, and aspects of, the scope of the present invention. These are given by way of example only, and it is understood that the following examples are not comprehensive or exhaustive of the many types of embodiments of the present invention that can be prepared in accordance with the present invention.

Comparative Example 1

Spherical Nanoparticles

A silver (Ag) target was held within a chamber through which flowed triple distilled deionized water. The silver (Ag) target was ablated using a primary laser with a 1064 nm wavelength at 80 mJ with a 1 mm focal spot size and with 9 nanosecond pulse lengths. The secondary laser was a continuous 532 nm laser with 0.5 W power going into a diffraction grating, which created three distinct electromagnetic fields in front of the silver (Ag) target. The process created 10 nm mean diameter silver (Ag) nanospheres, with 99+% of those nanospheres being within ±1 nm of the mean diameter.

Comparative Example 2

Spherical Nanoparticles

A silver (Ag) target was held within a chamber through which flowed triple distilled deionized water. The silver (Ag) target was ablated using a primary laser with a 1064 nm wavelength at 620 mJ with a 6 mm focal spot size and with 3.7 nanosecond pulse lengths. The secondary laser was a continuous 532 nm laser with 0.5 W power going into a diffraction grating, which created five distinct electromagnetic fields in front of the silver (Ag) target. The process created 14 nm mean diameter silver (Ag) nanospheres, with 99+% of those nanospheres being within ±1 nm of the mean diameter.

Comparative Example 3

Spherical Nanoparticles

A silver (Ag) anode wire target was ablated through a high voltage (800 V) between the target anode and a grounded silver (Ag) cathode. Both were submerged in a chamber through which flowed triple distilled deionized water. The secondary laser was a continuous 1064 nm laser with 5 W power that was not divided with any diffraction grating optics. The process created 10 nm mean diameter Ag nanospheres, with 99+% of those nanospheres being within ±1 nm of the mean diameter.

Comparative Example 4

Spherical Nanoparticles

A copper (Cu) target was held within a chamber through which flowed triple distilled deionized water. The copper (Cu) target was ablated using a primary laser with a 1064 nm wavelength at 80 mJ with a 1 mm focal spot size and with 9 nanosecond pulse lengths. The secondary laser was a continuous 264 nm laser with 0.25 W power going into a diffraction grating which created three distinct electromagnetic fields in front of the copper (Cu) target. The process created 8 nm mean diameter copper (Cu) nanospheres, with 99+% of those nanospheres being within ±1 nm of the mean diameter.

Example 5

Coral Nanoparticles

Laser ablation of a metal target surface was performed by a Nd-YAG laser at 1064 nm wavelength using 3.9 nanosecond pluses to deliver approximately 500 mJ energy per pulse. The secondary laser was a continuous 532 nm laser with 0.5 W power going into a diffraction grating, which created three distinct electromagnetic fields in front of the gold (Au) target. The distance of the secondary laser in front of the surface of the gold (Au) target was increased from 1 mm (Example 1) to 3 mm, which created coral-shaped nanoparticles instead of spherical-shaped nanoparticles as in Example 1. The process created gold (Au) nanoparticles having a mean diameter between 25-30 nm, with 99+% of those nanoparticles being within 10% of the mean diameter.

Example 6

Coral Nanoparticles

A gold (Au) target was held within a chamber through which flowed triple distilled deionized water. The gold (Au) target was ablated using a primary laser with a 1064 nm wavelength at 80 mJ with a 3 mm focal spot size and with 9 nanosecond pulse lengths. The secondary laser was a continuous 532 nm laser with 0.5 W power going into a diffraction grating, which created three distinct electromagnetic fields in front of the gold (Au) target. The distance of the secondary laser in front of the surface of the gold (Au) target was increased from 1 mm (Example 1) to 3 mm, which created coral-shaped nanoparticles instead of spherical-shaped nanoparticles as in Example 1. The process created coral-shaped gold (Au) nanoparticles having a mean diameter between 70-80 nm, with 99+% of those nanoparticals being within 10% of the mean diameter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for making coral-shaped metal nanoparticles, comprising:
   ablating a metal surface to create an ejecta plume containing metal nanoparticles moving away from the surface of the metal surface;
   providing at least one electromagnetic field in front of the metal surface being ablated at a distance and an energy density so as to cause the ejecta plume to form coral-shaped metal nanoparticles having a non-uniform cross section and a globular structure formed by multiple, non-linear strands joined together without right angles;
   manipulating, using the at least one electromagnetic field, the ejecta plume moving away from the metal surface so as to form the coral-shaped metal nanoparticles; and
   collecting the coral-shaped metal nanoparticles.

2. A method as in claim 1, wherein the coral-shaped metal nanoparticles have a length in a range of about 15 nm to about 100 nm.

3. A method as in claim 1, wherein the coral-shaped metal nanoparticles have a mean length and wherein at least 99% of the coral-shaped metal nanoparticles have a length within 30% of the mean length.

4. A method as in claim 1, wherein the electromagnetic field has an energy density less than the ionization energy of the metal forming the coral-shaped metal nanoparticles.

5. A method as in claim 1, wherein the at least one electromagnetic field contains at least three distinct electromagnetic fields.

6. A method as in claim 1, wherein ablating the metal surface to create the ejecta plume is performed by an ablation laser and wherein the at least one electromagnetic field is generated by a microwave source or one or more lasers.

7. A method as in claim 1, wherein ablating the metal surface to create the ejecta plume is performed by a first laser emitting ablation energy along a first line, and wherein the at least one electromagnetic field is generated by one or more additional lasers positioned so that the at least one electromagnetic field is substantially perpendicular to the first line and substantially parallel to the metal surface.

8. A method as in claim 1, further comprising repositioning the at least one electromagnetic field closer to the metal surface in order to accomplish one or more of reducing a mean particle size of the coral-shaped metal nanoparticles or forming spherical-shaped metal nanoparticles.

9. A method as in claim 1, wherein the coral-shaped metal nanoparticles comprise at least one metal selected from the group consisting of gold, platinum, silver, palladium, rhodium, osmium, ruthenium, rhenium, molybdenum, copper, iron, nickel, tin, beryllium, cobalt, antimony, chromium, manganese, zirconium, zinc, tungsten, titanium, vanadium, lanthanum, cerium, heterogeneous mixtures thereof, and alloys thereof.

10. A method of making coral-shaped metal nanoparticles, comprising:
    ablating a metal surface to create an ejecta plume containing metal nanoparticles moving away from the surface of the metal surface;
    providing at least one electromagnetic field in front of the metal surface being ablated at a distance of about 0.5 mm to about 5 mm and an energy density so as to cause the ejecta plume to form coral-shaped metal nanoparticles having a non-uniform cross section and a globular structure formed by multiple, non-linear strands joined together without right angles and having a particle size in a range of about 15 nm to about 100 nm;
    manipulating, using the at least one electromagnetic field, the ejecta plume moving away from the metal surface so as to form the coral-shaped metal nanoparticles; and
    collecting the coral-shaped metal nanoparticles.

11. A method as in claim 10, the at least one electromagnetic field being positioned in front of the metal surface being ablated at a distance of about 1 mm to about 3 mm.

12. A method as in claim 10, wherein the metal surface comprise at least one metal selected from the group consisting of gold, platinum, silver, palladium, rhodium, osmium, ruthenium, rhenium, molybdenum, copper, iron, nickel, tin, beryllium, cobalt, antimony, chromium, manganese, zirconium, zinc, tungsten, titanium, vanadium, lanthanum, cerium, heterogeneous mixtures thereof, and alloys thereof.

13. A method of making coral-shaped and spherical-shaped metal nanoparticles, comprising:
  ablating a metal surface using first pulsed electromagnetic energy to create a first series of ejecta plumes containing metal nanoparticles moving away from the surface of the metal surface;
  providing an electromagnetic field in front of the metal surface at a distance of about 0.5 mm to about 5 mm and an energy density so as to cause the first series of ejecta plumes to form coral-shaped metal nanoparticles having a non-uniform cross section and a globular structure formed by multiple, non-linear strands joined together without right angles;
  manipulating, using the electromagnetic field, the first series of ejecta plumes moving away from the metal surface so as to form the coral-shaped metal nanoparticles having a particle size in a range of about 15 nm to about 100 nm;
  collecting the coral-shaped metal nanoparticles;
  positioning the electromagnetic field, or a different electromagnetic field, closer to the metal surface, or a different metal surface, at a distance of about 0.5 mm to about 1.5 mm;
  ablating the metal surface, or the different metal surface, using second pulsed electromagnetic energy to create a second series of ejecta plumes containing metal nanoparticles moving away from the surface of the metal surface;
  manipulating, using the electromagnetic field or the second electromagnetic field, the second series of ejecta plumes moving away from the metal surface, or the second metal surface, so as to form spherical-shaped metal nanoparticles having a particle size of 40 nm or less; and
  collecting the spherical-shaped metal nanoparticles.

* * * * *

UNITED STATES PATENT AND TRADEMARK OFFICE
CERTIFICATE OF CORRECTION

PATENT NO. : 9,919,363 B2
APPLICATION NO. : 14/861500
DATED : March 20, 2018
INVENTOR(S) : William Harold Niedermeyer It is certified that error appears in the above-identified patent and that said Letters Patent is hereby corrected as shown below:

On the Title Page

<u>Item (56), Page 2, FOREIGN PATENT DOCUMENTS, Right Hand Column</u>
Change "KR 20060021749 8/2006" to —KR 20060021749 3/2006—

<u>Item (56), Page 3, OTHER PUBLICATIONS, Left Hand Column</u>
Change "Santos et al., "Enhancemetn of antibiotic effect via gold:silver-alloy nanoparticles", J. Nanopart Res (2012) 14:859, pp. 1-8." to —Enhancement of antibiotic effect via gold:silver-alloy nanoparticles", J. Nanopart Res (2012) 14:859, pp. 1-8.—

In the Specification

<u>Column 1</u>
Line 25, change "23 nm)." to —23 nm.—

<u>Column 2</u>
Line 33, change "front the" to —front of the—

<u>Column 3</u>
Line 27, change "from" to —front—

<u>Column 4</u>
Line 14, change "optics 14" to —optics 32—

<u>Column 7</u>
Line 2, remove [44]

Signed and Sealed this
Seventeenth Day of July, 2018

Andrei Iancu
*Director of the United States Patent and Trademark Office*

Column 8
Line 24, change "embodiment" to —embodiments—
Line 55, change "into reactor" to —into the reactor—

Column 13
Line 36, change "which" to —which is—
Line 63, change "comparative" to —comparative examples—

Column 16
Line 61, change "comprise" to —comprises—